A. C. REEDER.
POTATO AND PEANUT HARVESTER.
APPLICATION FILED JUNE 29, 1915.
1,185,540.
Patented May 30, 1916.
2 SHEETS—SHEET 1.
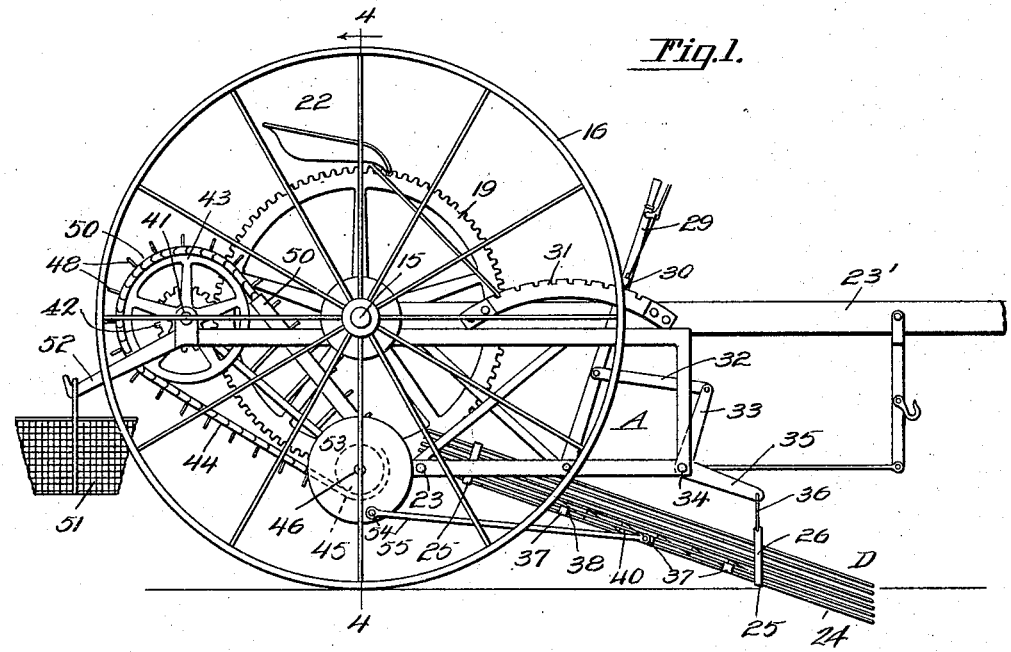
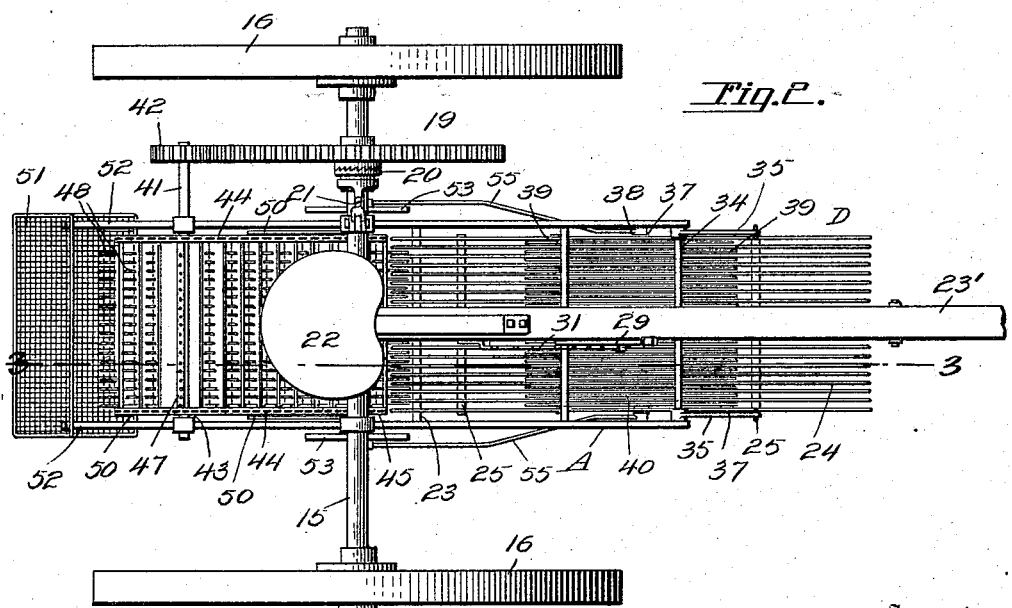
Inventor
Addison C. Reeder.
Witnesses
By Victor J. Evans
Attorney

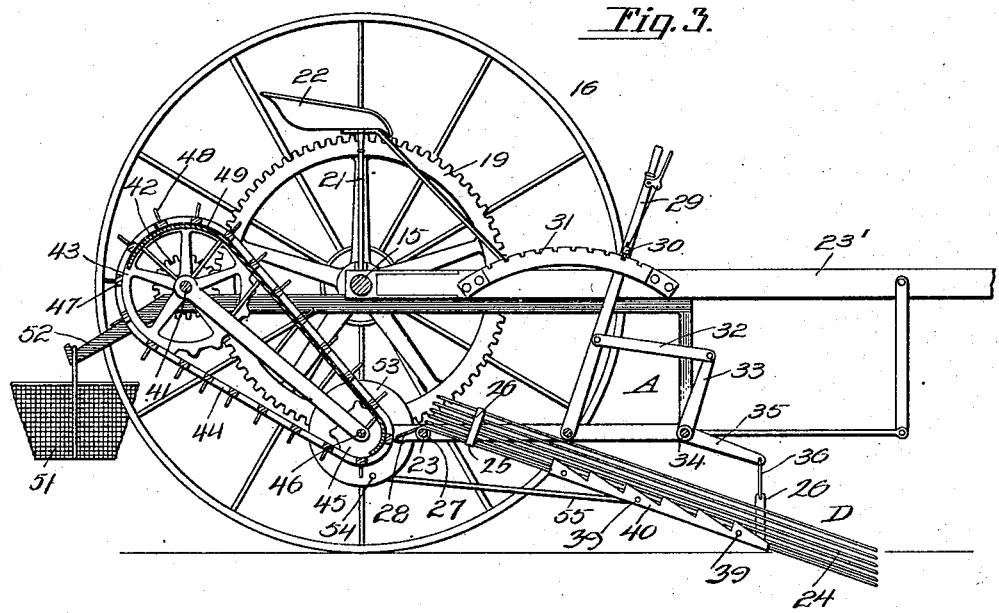
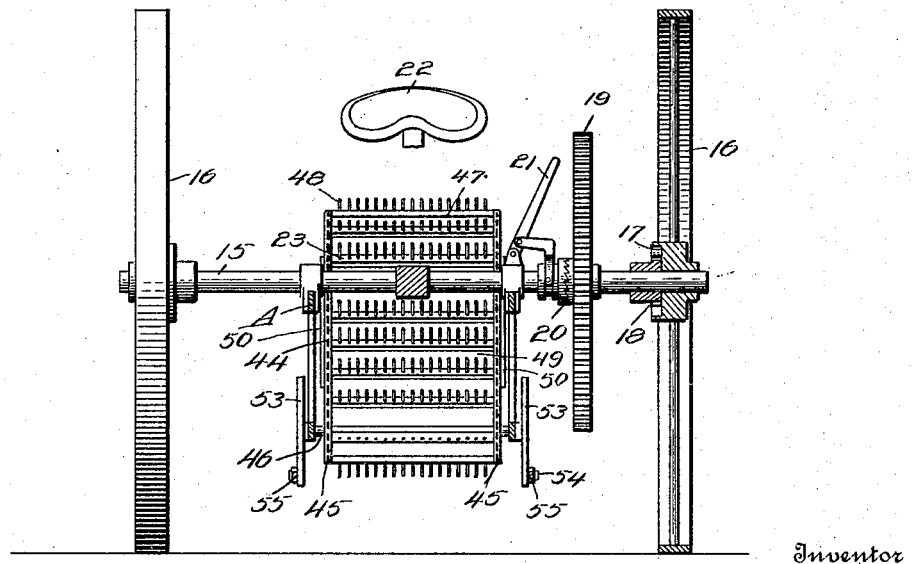

UNITED STATES PATENT OFFICE.

ADDISON C. REEDER, OF SABINE, TEXAS.

POTATO AND PEANUT HARVESTER.

1,185,540.  Specification of Letters Patent.  Patented May 30, 1916.

Application filed June 29, 1915. Serial No. 37,040.

*To all whom it may concern:*

Be it known that I, ADDISON C. REEDER, a native-born citizen of the United States, residing at Sabine, in the county of Jefferson and State of Texas, have invented new and useful Improvements in Potato and Peanut Harvesters, of which the following is a specification.

This invention relates to machines for digging and harvesting potatoes, peanuts and the like, and it has for its object to produce a machine of this kind which will be simple in construction and efficient in operation.

A particular object of the present invention is to simplify and improve the means whereby the peanuts or the like are dug from the ground, separated from adhering dirt and impurities and discharged upon a conveyer or carrier whereby the material is conveyed to a basket or other receptacle.

A further object of the invention is to simplify and improve the frame structure and the manner of assembling the operating parts, therewith.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings: Figure 1 is a side elevation of a machine constructed in accordance with the invention. Fig. 2 is a top plan view of the same. Fig. 3 is a longitudinal sectional view taken on the line 3—3 in Fig. 2. Fig. 4 is a transverse sectional view taken on the line 4—4 in Fig. 1.

Corresponding parts in the several figures are denoted by like characters of reference.

The frame A of the improved machine is supported on an axle 15 having ground wheels 16, one or both of which are preferably provided with pawls 17 engaging ratchets 18 on the axle so that the latter will be rotated when the machine advances in a forward direction, while when the machine is moved in a rearward direction the wheels will rotate without rotating the axle. The axle carries a spur wheel 19 which is loose on the axle, but which may be connected therewith for rotation by means of a clutch 20 of conventional construction adapted to be operated by means of a lever 21, the latter being within convenient reach of the driver or operator whose seat 22 is supported on the tongue 23' which may be regarded as constituting a part of the frame structure.

The frame is provided with a cross bar or brace rod 23 with which the digger D is hingedly connected. Said digger is composed of a plurality of rods 24 which are connected at intervals by means of braces 25 provided at the ends thereof with upwardly extending limbs 26 presenting an approximately U-shaped appearance. The rods 24 and the braces 25 will thus coöperate to form a sieve-like trough or chute of substantially U-shaped cross section, it being understood that the rods 24 are to be sufficiently stiff and rigid to penetrate into the ground and to act as digging elements, and it being further understood that the said rods are to be variously spaced apart according to the nature of the crop that is to be harvested. Thus, it is obvious that in a peanut digger, the rods 24 must be placed closer together than would be necessary in a potato harvester. It is further to be understood that while no limitation is intended as to the precise manner of constructing the digger, the rods 24 are preferably connected with the upper faces of the brace members 25, so that there will be no obstruction to the upward passage of material over the rods of the digger. The rods 24 at the bottom of the digger are bent at their upper rearward ends to form eyes 27 and rearwardly extending fingers 28, the eyes 27 being engaged with the rod 23, thereby forming a pivotal connection between said rod and the digger.

For the purpose of effecting adjustment of the digger there is provided a lever 29 having a stop member 30 engaging a rack segment 31, said lever being connected by a link rod 32 with an arm 33 extending upwardly from a rock shaft 34 having crank arms 35 that are connected by links 36 with the upwardly extending limbs 26 of one of the brace members 25. It is obvious that by manipulating the hand lever 29 the lower forward end of the digger may be adjusted vertically and supported in various positions for operation and for transportation, as may be required.

The digger is provided at the sides thereof with slides 37 which are fitted between the rods 24 at the outer sides of the bottom portion of the chute constituting the digger and the rods 24 adjacent to the lower ends of the upwardly extending limbs 26, said slides being formed with recesses 38 for engagement with the rods on which they are guided. The slides 37 at the two sides of the digger are connected together by cross bars or rods 39 on which ratchet bars 40 are secured at proper intervals. The ratchet bars 40, which may be formed of rods or wires by properly bending the same, are supported on the rods 24 that form the bottom portion of the digger for sliding engagement therewith, thereby insuring that they will be properly supported and also that they will not obstruct the interspaces between the rods 24. A shaft 41, which is supported for rotation near the rearward end of the frame, carries a pinion 42 meshing with the spur wheel 19 and receiving motion therefrom. The shaft 41 also carries sprocket wheels 43 over which are trained endless chains 44, said chains being also guided over sprocket wheels 45 on a shaft 46 in rear of the cross bar or rod 23. The chains 44 are connected together at intervals by slats 47 having teeth 48 which are so disposed as to pass between the rearwardly extending arms 28 of the rods 24 which constitute the bottom part of the digger. A stationary floor 49 is provided having side flanges 50 between which the endless conveyer comprising the chains 44 and the toothed slats 47 is guided, said floor and side flanges constituting a conveyer trough over which the products are elevated and deposited in a basket or receptacle 51 which is supported on brackets 52 that project rearwardly from the side members of the frame. The shaft 46 is provided with wheels 53, each having a wrist pin 54 connected by a pitman 55 with one of the slides 37, thereby transmitting reciprocatory motion to said slides and to the related parts which coöperate therewith to form the lifting device whereby the products are elevated from the digger.

From the foregoing description, taken in connection with the drawings hereto annexed, the operation and advantages of this invention will be readily understood. Before starting the operation of the machine the vines, weeds and similar obstructions should be removed. When the machine is drawn over the ground, the forward end of the digger is lowered sufficiently to penetrate into the soil and to lift or elevate the potatoes, or other products which as the machine progresses will be assisted in the upward passage over the digger by the primary conveyer including the slides 37, the cross bars 39 and the ratchet bars 40 carried thereby. The products will also in this manner be agitated, causing the adhering dirt to drop between the rods 24 of the digger. As the products pass over the arms or extensions 28 at the upper rearward ends of the rods 24, they will be assisted by the toothed slats 47 of the elevating conveyer and will be thereby carried over the floor 49 and deposited in the receptacle 51 which at suitable intervals may be emptied.

It will be seen that by the construction herein described a machine is provided which is extremely simple in construction, inexpensive and light of draft, and one which will be found particularly useful and efficient for the purpose for which it is provided.

Having thus described the invention, what is claimed as new, is:—

1. In a machine of the class described, a digger comprising a plurality of longitudinally disposed rods and a plurality of cross bars having terminal upwardly extending limbs on which said rods are supported in spaced relation to produce a sieve-like trough, the rods forming the bottom of the trough being provided with eyes, in combination with a carrying frame having a cross bar engaging said eyes.

2. In a machine of the class described, a wheel supported carrying frame having a cross bar, and a driven shaft in rear of said cross bar, a digger comprising a plurality of longitudinally disposed rods, and cross bars having upwardly extending limbs with which said rods are connected to form a trough-like structure, some of said rods being provided with eyes and with rearwardly extending arms, an elevating conveyer trained over the shaft in rear of the cross bar and having toothed slats, the teeth of which engage between the rearwardly extending arms of the digger rods, and means for driving the endless conveyer.

3. In a machine of the class described, a wheel supported carrying frame having a cross bar and a shaft in rear thereof, a digger comprising a plurality of longitudinally disposed rods and a plurality of cross bars having upwardly extending limbs on which the rods are mounted to form a trough-like structure, some of said rods being provided with eyes engaging the cross bar of the frame, slides guided between some of the rods at the sides of the digger, cross bars connecting said slides, ratchet bars mounted on the last-named cross bars, wheels on the shaft, said wheels having wrist pins, pitmen connecting the wrist pins with the slides, and means for driving the shaft.

4. In a machine of the class described, a wheel supported carrying frame, a digger hingedly connected therewith, said digger comprising a plurality of longitudinally disposed rods and cross bars having upstanding limbs whereby said rods are connected to form a trough-like structure, slides guided between some of the rods at the sides of the digger, means for imparting reciprocatory motion to said slides, cross bars connecting the slides, and ratchet bars carried by the slides, said ratchet bars being positioned in sliding engagement with the rods forming the bottom portion of the trough-like structure of the digger.

5. In a machine of the class described, a wheel supported carrying frame, a digger hingedly connected therewith, said digger comprising a plurality of longitudinally disposed rods and cross bars having upstanding limbs whereby said rods are connected to form a trough-like structure, slides guided between some of the rods at the sides of the digger, means for imparting reciprocatory motion to said slides, cross bars connecting the slides, and ratchet bars carried by the slides, said ratchet bars being positioned in sliding engagement with the rods forming the bottom portion of the trough-like structure of the digger, in combination with an elevating conveyer to receive the products discharged over the digger.

In testimony whereof I affix my signature in presence of two witnesses.

ADDISON C. REEDER.

Witnesses:
ROBT. CLINKINGHEAD,
FRED WATHMAN.

Copies of this patent may be obtained for five cents each, by addressing the "Commissioner of Patents. Washington, D. C."